United States Patent
Kritt et al.

(10) Patent No.: US 9,190,841 B2
(45) Date of Patent: Nov. 17, 2015

(54) CONTROLLING THE DISTRIBUTION OF MOTOR VEHICLE BATTERY POWER TO CONSUMING DEVICES DURING BATTERY DISCHARGE

(75) Inventors: Barry Alan Kritt, Raleigh, NC (US); Sarbajit Kumar Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 776 days.

(21) Appl. No.: 13/453,030

(22) Filed: Apr. 23, 2012

(65) Prior Publication Data

US 2013/0278054 A1 Oct. 24, 2013

(51) Int. Cl.
- *B60L 1/00* (2006.01)
- *H02J 1/14* (2006.01)
- *H02J 7/00* (2006.01)

(52) U.S. Cl.
CPC ............... *H02J 1/14* (2013.01); *H02J 7/0047* (2013.01); *Y10T 307/414* (2015.04)

(58) Field of Classification Search
CPC .................................. H02J 7/0047; H02J 1/14
USPC .......................................................... 307/10.1
See application file for complete search history.

(56) References Cited

U.S. PATENT DOCUMENTS

| 7,787,405 | B2  |   | 8/2010  | Dettinger et al. |         |
|-----------|-----|---|---------|------------------|---------|
| 8,768,419 | B2  | * | 7/2014  | Sivaraman et al. | 455/573 |
| 8,831,807 | B2  | * | 9/2014  | Dehmann          | 701/22  |
| 2008/0178019 | A1 | * | 7/2008 | McGrane et al.  | 713/320 |
| 2010/0332233 | A1 |   | 12/2010 | Chen et al.     |         |

FOREIGN PATENT DOCUMENTS

JP 2006087228 A 3/2006

* cited by examiner

*Primary Examiner* — Jared Fureman
*Assistant Examiner* — Duc M Pham
(74) *Attorney, Agent, or Firm* — J. B. Kraft; Damion Josephs

(57) ABSTRACT

A user of an automobile interactive onboard computer display monitors and controls battery power distribution during discharge. The user is enabled to interactively enter into a computer controlled display, proportions of the total battery power to be distributed to each of a set of devices. The distribution of the battery power to each of the devices is then monitored. The distribution of power to a specific device is halted when the power distributed to the specific device reaches the maximum of the proportion of the entered battery power to be distributed to the specific device.

21 Claims, 5 Drawing Sheets

CONTROLLING THE DISTRIBUTION OF MOTOR VEHICLE BATTERY POWER TO CONSUMING DEVICES DURING BATTERY DISCHARGE

TECHNICAL FIELD

The present invention relates to implementations for controlling the distribution of power from a motor vehicle, e.g. automobile rechargeable battery, during time periods when the battery is discharging to a variety of consuming devices.

BACKGROUND OF RELATED ART

Rechargeable batteries have been in use for almost as long as motor vehicles carrying such batteries have existed. For almost one hundred years, the discharge of charged automobile batteries has been monitored and responded to through the simplest of battery charge/discharge dashboard gauges. However, over the past generation, the distribution loads imposed upon automotive batteries during the discharge periods, when the battery is not being charged by automobile, have increased. Furthermore, the distribution of the battery power is becoming increasingly complex and hard to monitor. This leads to potential failures of battery functions that are essential to the automobile, such as power for the automobile starter.

In present day conventional motor vehicles, powerful audio systems consume battery power, as do television devices and heat/cool climate control devices. Hybrid automobiles that alternate battery power and combustion power, as needed, present an even greater need for controlling battery power distribution during discharge periods. Ultimately, the power distribution is critical in fully electrical automobiles wherein the automobile is running on the discharging of the charged battery.

SUMMARY OF THE PRESENT INVENTION

The present invention offers the user of the automobile interactive monitoring and control of battery power distribution during discharge through an onboard computer controlled display. The user interactive implementation comprises enabling a user to interactively enter, into a computer controlled display, proportions of the total battery power to be distributed to each of a set of devices through the control of a computer. The distribution of the battery power to each of the devices is then monitored and the distribution of power to a specific device is halted when the power distributed to the specific device reaches the maximum of the proportion of the entered battery power to be distributed to the specific device.

In accordance with a more specific aspect of this invention, the consuming devices receiving the user set proportions of the battery power may be prioritized. Also, minimum levels may be set for one or more of the power consuming devices, wherein the power proportion maintained for the selected device is not permitted to go below the minimum level.

Another aspect of this invention provides for enabling the user to enter a set of alternate proportions of battery power to be distributed to the set of devices. These alternate sets of distributed proportions may be set up to go into effect under different conditions determined by geography, e.g. location or period of time (time of day or calendar period).

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
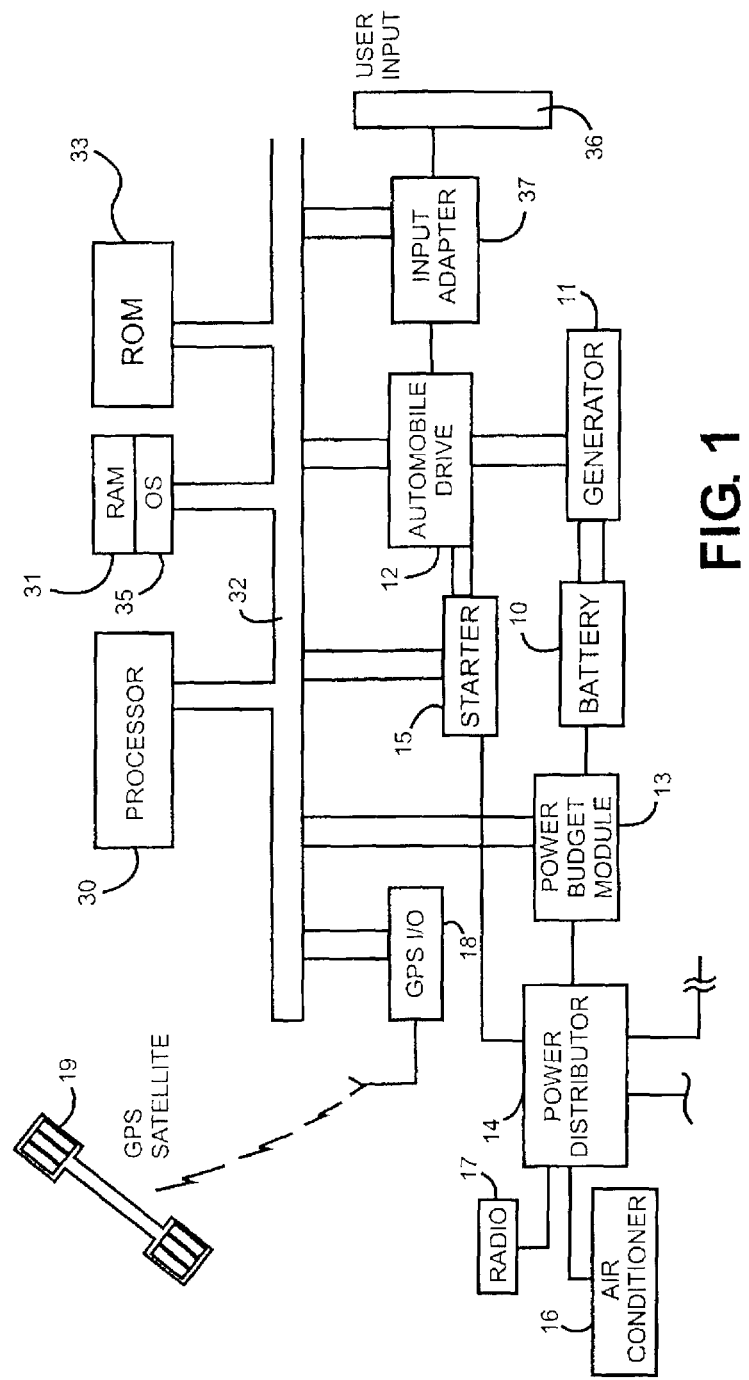
FIG. 1 is a simplified illustrative diagrammatic view of an onboard computer system that may be used to implement the present invention.

Referring to FIG. 1, there is provided a diagrammatic view of a typical computer control system that may function as an automobile on-board controller for various automotive functions, including the vehicle operational functions, as well as the apparatus in accordance with the present invention for carrying out the setting up of the proportions and controlling the battery discharge distribution. An operating system (OS) 35 that runs on processor 30 provides control and is used to coordinate the functions of the various components of the control system. The OS 35 is stored in Random Access Memory (RAM) 31. The programs for controlling the various functions of the automobile are stored in RAM 31 and include the power budget module 13 that provides the dialog with user, to be subsequently described with respect to FIGS. 2-5, utilizing interactive user input via display 36 connected via display adapter 37. Power budget module 13 controls the battery 10 power distribution, based upon user input proportions, via power distributor 14, to devices: starter 15, radio/audio 17 and air conditioner 16. In normal automobile operations, when the automobile is started via starter 15 and running, the automobile drive system 12 drives generator 11 to recharge battery 10. In the case, of a hybrid automobile that alternates driving the automobile with battery power or standard internal combustion engines, FIG. 1's implementation would be applicable to internal combustion driving. The alternate driving (not shown) battery system would rely on charging the battery as shown in FIG. 1 during the combustion engine drive, as well as supplementing the battery charging with a plug-in electrical source. Of course, the controlling of battery discharge proportions would be particularly important because of the use of battery discharge to drive the automobile.

Figure 3:
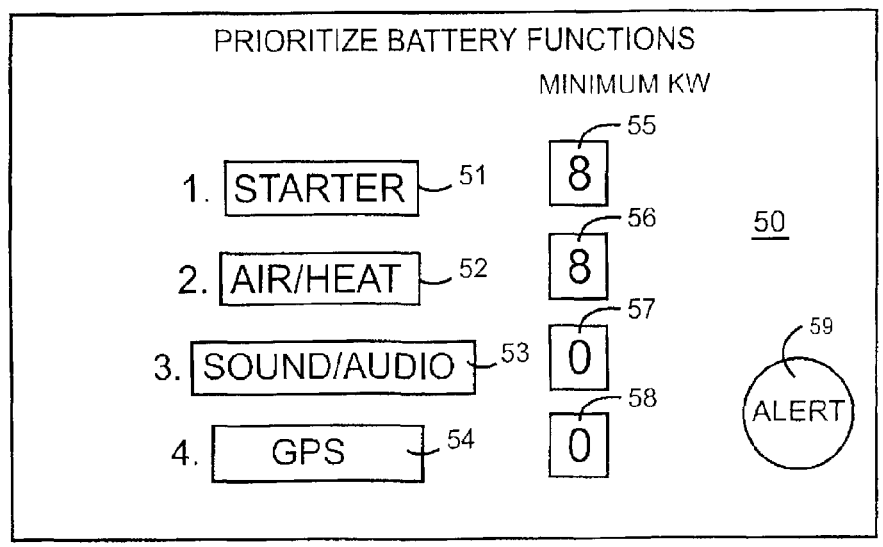
FIG. 3 is a generalized diagrammatic view of the display screen of an onboard computer showing a dialog table for prompting a user to enter power priority levels for consuming devices.

In accordance with an aspect of the present invention, to be described with respect to FIG. 3, wherein a location dependent alternate set of battery power distribution proportions is provided, the location of the automobile determines the alternate power location via GPS satellite 19 and input via GPS I/O 18.

Figure 2:
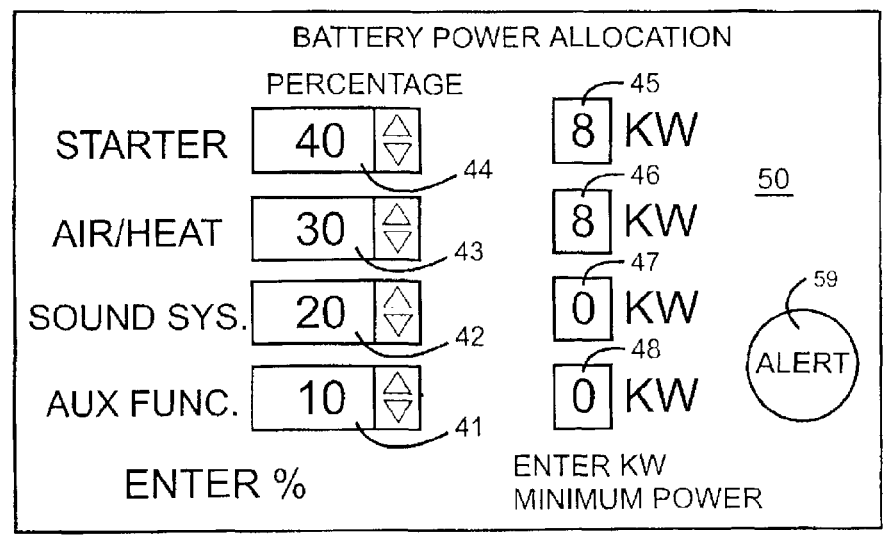
FIG. 2 is a generalized diagrammatic view of the display screen of an onboard computer showing a dialog table for prompting a user to enter the selected proportions of total battery discharge power to be allocated for each device consuming battery power and minimum power to be reserved for each device.

FIG. 2 is a generalized diagrammatic view of the display screen 50 of an onboard computer showing a dialog table for prompting a user to enter the selected proportions of total battery discharge power to be allocated for each device consuming battery power, and minimum power to be reserved of each device. Thus, in this illustrative example, the user has entered percentages 42 through 44 respectively for the sound system, air/heat and starter. It is noted that the highest proportion of discharge power is reserved for the starter 44. Since, there are devices for which available power must be maintained above a predetermined minimum, the user is enabled via inputs 45 through 48 to enter minimum power levels 45 through 48 for the devices. It is noted that there are zero power levels 47, 48 that must be maintained for the sound system and miscellaneous auxiliary functions, since these devices are not critical to the automobile operation. There are minimum power levels 45, 46 for the starter and air/heat, since these devices are considered critical to automotive operation. There is also an alert signal 59 that will flash when the power allocated for a device falls below a critical level. This may be accompanied by an audio alarm when appropriate.

FIG. 3 is a generalized diagrammatic view of the display screen 50 of an onboard computer showing a dialog table for prompting a user to enter power priority levels for consuming devices. The priority levels 1 through 4 have been set: from the highest 51 for starter through air/heat 52, sound 53, to the lowest for GPS 54. There, again, the user is prompted to enter minimum power levels 55 through 58 for the devices. Here, again, alert signal 59 will flash when the power allocated for a device falls below a critical level.

Figure 4:
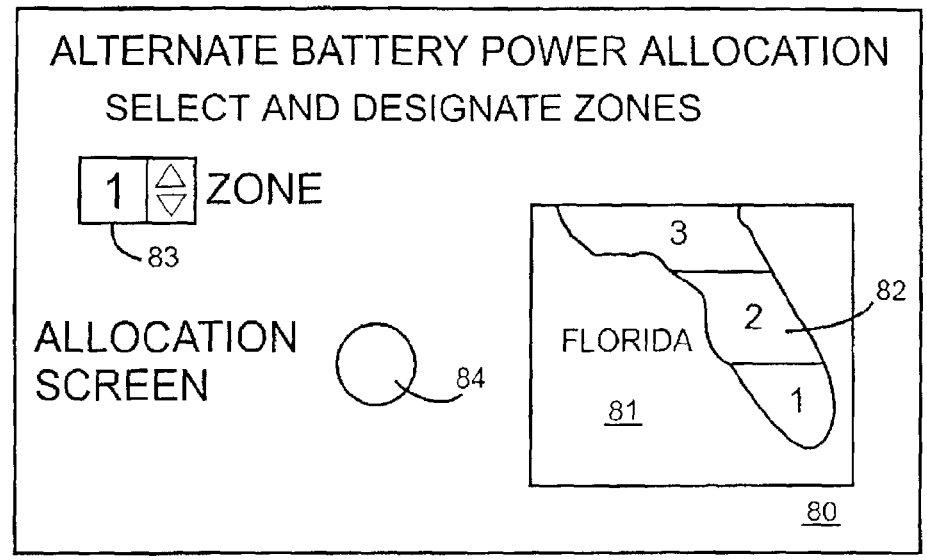
FIG. 4 is a generalized diagrammatic view of the display screen of an onboard computer showing dialog boxes for prompting a user to commence the entry of data for providing an alternate set of power proportions for devices based upon location of the motor vehicle.

FIG. 4 is a generalized diagrammatic view of the display screen 80 of an onboard computer showing dialog boxes for prompting a user to commence the entry of data for providing an alternate set of power proportions for devices based upon location of the motor vehicle. Where a user wishes to provide such an alternate set of power proportions, a zone map 81 may be provided, and user is prompted to select a zone 82 from the displayed map and enter the selected zone via dialog prompt 83, and request 84, an allocation screen. The user will then be provided a proportion entry dialog screen, like the screen of FIG. 2, on which the user may proceed to enter the alternate battery power allocations as previously described with respect to FIG. 2.

While the illustration in FIG. 4 has location areas defined in large zones, it should be understood that locations of battery reserve power may defined with finer granularity. For example, in electrically powered vehicles, the locations of greatest battery power reserve may be based upon the distance from a charging source: the user's home or known battery recharge source stations offered by power providers.

Figure 5:
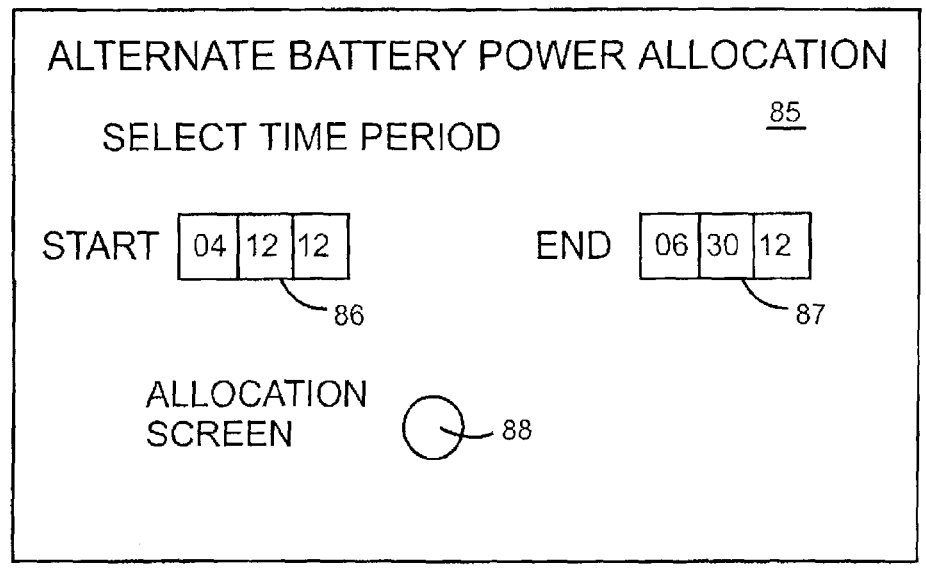
FIG. 5 is a generalized diagrammatic view of the display screen of an onboard computer showing dialog boxes for prompting a user to commence the entry of data for providing an alternate set of power proportions for devices based upon selected time periods.

FIG. 5 is a generalized diagrammatic view of the display screen of an onboard computer showing dialog boxes for prompting a user to commence the entry of data for providing an alternate set of power proportions for devices based upon selected time periods. Similarly, to the alternate allocation described with respect to FIG. 4, the user is prompted via dialog prompts 86 and 87 on display 85 to enter a start time 86 and an end time 87 for the selected time period. When the user then requests 88, the user will be provided with a proportion entry dialog screen like the screen of FIG. 2 on which the user may proceed to enter the alternate battery power allocations as previously described with respect to FIG. 2.

The selected time period may be repetitive and periodic, e.g. certain time periods each day. A user may wish to have a higher amount of reserve battery power during each early winter morning in places with very cold ambient temperatures.

Figure 6:
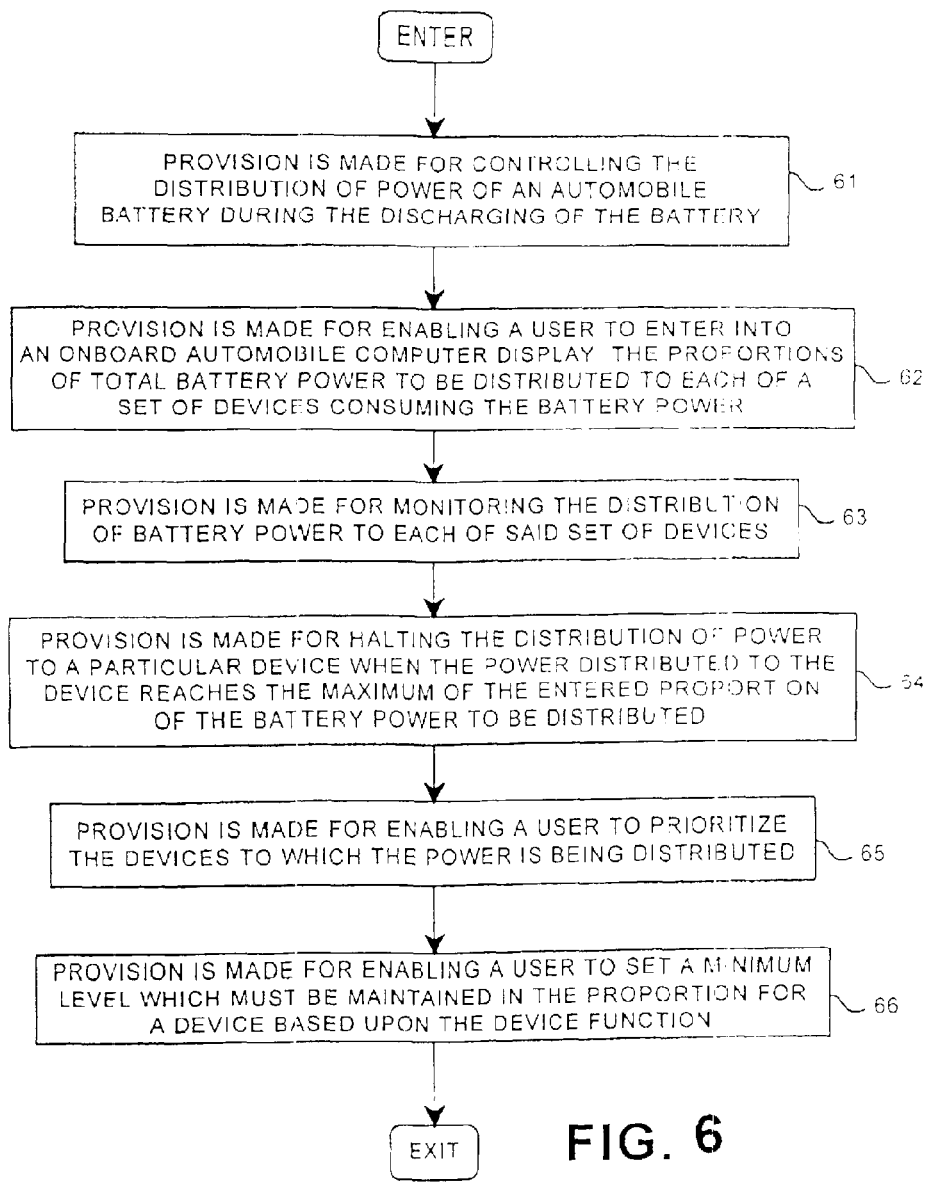
FIG. 6 is a general flowchart of a program set up to implement the present invention for setting proportions of battery power to be allocated among consuming devices.

FIG. 6 is a general flowchart of a program set up to implement the present invention for setting proportions of battery power to be allocated among consuming devices. Provision is made for controlling the distribution of power of an automobile battery during the discharge of the battery, step 61. Provision is made for enabling a user to enter into an onboard automobile computer display, the proportion of total battery power to be distributed to each of a set of devices consuming battery power, step 62. Provision is made for monitoring the distribution of battery power to each of the set devices, step 63. Provision is made for halting the distribution of power to a particular device when the power distributed to the device reaches the maximum of the entered proportion of the battery power to be distributed to the device, step 64. Provision is made for enabling a user to prioritize the devices to which the power is being distributed, step 65. Provision is made for enabling a user to set a minimum level that must be maintained in the proportion for a device based upon the device function, step 66.

Figure 7:
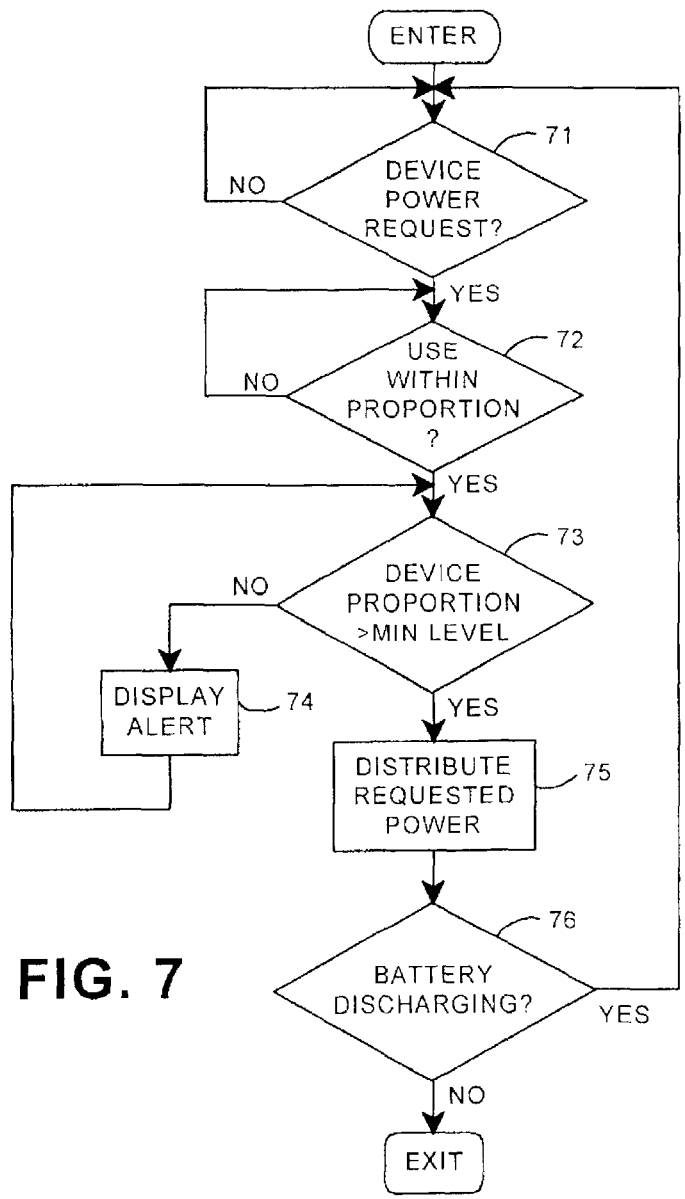
FIG. 7 is a generalized sample run of the program of FIG. 6.

FIG. 7 is a generalized sample run of the program of FIG. 6 for the control of battery power distribution. A determination is made 71 as to whether a device has requested power from the battery. If Yes, then a determination is made 72 as to whether the power requested is still within the proportion allocated for the device. If Yes, a further determination 73 is made as to whether the device proportion from which power is requested is below its set minimum level. If No, an alert is displayed 74 and the process is returned to step 73. If Yes, then the requested power is distributed to the requesting device, step 75. At this point, a determination may conveniently be made 76 as to whether the battery is discharging power. If Yes, the process is returned to step 71. If No, the process is exited.

As will be appreciated by one skilled in the art, aspects of the present invention may be embodied as a system, method or computer program product. Accordingly, aspects of the present invention may take the form of an entirely hardware embodiment, an entirely software embodiment, including firmware, resident software, micro-code, etc.; or an embodiment combining software and hardware aspects that may all generally be referred to herein as a "circuit", "module" or "system." Furthermore, aspects of the present invention may take the form of a computer program product embodied in one or more computer readable mediums having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus or device, or any suitable combination of the foregoing. More specific examples (a non-exhaustive list) of the computer readable storage medium would include the following: an electrical connection having one or more wires, a portable computer diskette, a hard disk, a Random Access Memory ("RAM"), a Read Only Memory ("ROM"), an Erasable Programmable Read Only Memory ("EPROM" or Flash memory), an optical fiber, a portable compact disc read only memory ("CD-ROM"), an optical storage device, a magnetic storage device or any suitable combination of the foregoing.

In the context of this document, a computer readable storage medium may be any tangible medium that can contain or store a program for use by or in connection with an instruction execution system, apparatus or device.

A computer readable medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including, but not limited to, wireless, wire line, optical fiber cable, RF, etc., or any suitable combination the foregoing.

Computer program code for carrying out operations for aspects of the present invention may be written in any combination of one or more programming languages, including an object oriented programming language, such as Java, Smalltalk, C++ and the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the later scenario, the remote computer may be connected to the user's computer through any type of network, including a local area network ("LAN") or a wide area network ("WAN"), or the connection may be made to an external computer (for example, through the Internet, using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer or other programmable data processing apparatus to produce a machine, such that instructions, which execute via the processor of the computer or other programmable data processing apparatus, create means for implementing the functions/acts specified flowchart and/or block diagram block or blocks.

These computer program instructions may also be stored in a computer readable medium that can direct a computer, other programmable data processing apparatus or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the Figures illustrate the architecture, functionality and operations of possible implementations of systems, methods and computer program products according to various embodiments of the present invention. In this regard, each block in the flowchart or block diagrams may represent a module segment, or portion of code, which comprises one or more executable instructions for implementing the specified logical function(s). It should be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations can be implemented by special purpose hardware-based systems that perform the specified functions or acts, or combinations of special purpose hardware and computer instructions.

Although certain preferred embodiments have been shown and described, it will be understood that many changes and modifications may be made therein without departing from the scope and intent of the appended claims.

What is claimed is:

1. A method for controlling power distribution of a rechargeable on-board motor vehicle battery to a set of devices comprising:
    enabling a user to interactively enter, into a computer controlled display, proportions of the total battery power to be distributed to each of said set of devices based upon the functions of said devices;
    monitoring the distribution of said battery power to each of said devices;
    enabling a user to enter a set of predetermined alternate proportions of battery power to be distributed to said set of devices in response to predetermined conditions; and
    halting the distribution of power to a specific device when the power distributed to the specific device reaches the maximum of the proportion of the entered battery power to be distributed to said specific device.

2. The method of claim 1, wherein:
    said battery is an automobile battery; and
    said alternate set of proportions is based upon the location of the automobile.

3. The method of claim 2, wherein:
    said battery is in a hybrid type automobile which runs on either battery power or combustion fuel; and
    said alternate set proportions is based upon the proximity to battery recharge and fuel sources.

4. The method of claim 1, wherein:
    said battery is an automobile battery; and
    said alternate set of proportions is based upon the time period of usage.

5. The method of claim 1, wherein:
    said battery is an automobile battery; and
    further enabling said user to prioritize proportions of total battery power based upon said device functions.

6. The method of claim 1 further enabling the user to set a minimum level of battery power to be maintained in at least one of said proportions based upon the function of the device.

7. The method of claim 6, wherein:
    said battery is an automobile battery; and said minimum level which must be maintained is in the proportion of the total battery power to be distributed to the automobile starting device.

8. A computer controlled system for controlling power distribution of a rechargeable motor vehicle battery to a set of devices, comprising:
  a processor; and
  a computer memory holding computer program instructions which when executed by the processor perform the method comprising:
  enabling a user to interactively enter, into a computer controlled display, proportions of the total battery power to be distributed to each of said set of devices based upon the functions of said devices;
  monitoring the distribution of said battery power to each of said devices
  enabling a user to enter a set of predetermined alternate proportions of battery power to be distributed to said set of devices in response to predetermined conditions; and
  halting the distribution of power to a specific device when the power distributed to the specific device reaches the maximum of the proportion of the entered battery power to be distributed to said specific device.

9. The system of claim 8, wherein:
  said battery is an automobile battery; and
  said set of alternate proportions is based upon the location of the automobile.

10. The system of claim 9, wherein:
  said battery is in a hybrid type automobile which runs on either battery power or combustion fuel; and
  said set of alternate proportions is based upon the proximity to battery recharge and fuel sources.

11. The system of claim 8, wherein:
  said battery is an automobile battery; and
  said set of proportions is based upon the time period of usage.

12. The system of claim 8, wherein:
  said battery is an automobile battery; and
  said performed method further enables said user to prioritize proportions of total battery power based upon said device functions.

13. The system of claim 8, wherein said performed method further enables the user to set a minimum level of battery power to be maintained in at least one of said proportions of the total battery power to be distributed based upon the function of the device.

14. The system of claim 13, wherein:
  said battery is an automobile battery; and
  said minimum level which must be maintained is in the proportion of the total battery power to be distributed to the automobile starting device.

15. A computer usable non-transitory storage medium having stored thereon a computer readable program for controlling power distribution of a rechargeable motor vehicle battery to a set of devices, wherein the computer readable program when executed on a computer causes the computer to:
  enable a user to interactively enter, into a computer controlled display, proportions of the total battery power to be distributed to each of said set of devices based upon the functions of said devices;
  monitor the distribution of said battery power to each of said devices;
  enable a user to enter a set of predetermined alternate proportions of battery power to be distributed to said set of devices in response to predetermined conditions; and
  halt the distribution of power to a specific device when the power distributed to the specific device reaches the maximum of the proportion of the entered battery power to be distributed to said specific device.

16. The computer usable storage medium of claim 15, wherein:
  said battery is an automobile battery; and
  said alternate set of proportions is based upon the location of the automobile.

17. The computer usable storage medium of claim 15, wherein:
  said battery is an automobile battery; and
  said alternate set of proportions is based upon the time period of usage.

18. The computer usable storage medium of claim 15, wherein:
  said battery is an automobile battery; and
  said computer program, when executed further enables said user to prioritize proportions of total battery power based upon said device functions.

19. The computer usable medium of claim 15, wherein said computer program, when executed, further enables the user to set a minimum level of battery power to be maintained in at least one of said proportions based upon the function of the device.

20. The computer usable medium of claim 19, wherein:
  said battery is an automobile battery; and
  said minimum level which must be maintained is in the proportion of the total battery power to be distributed to the automobile starting device.

21. The computer usable medium of claim 15, wherein:
  said battery is in a hybrid type automobile which runs on either battery power or combustion fuel; and
  said alternate set of proportions is based upon the proximity to battery recharge and fuel sources.

* * * * *